J. O. ELTON AND R. B. CAPLES.
PROCESS OF TREATING RESIDUES CONTAINING ZINC, COPPER, AND CADMIUM.
APPLICATION FILED JAN. 5, 1920.
1,343,619. Patented June 15, 1920.
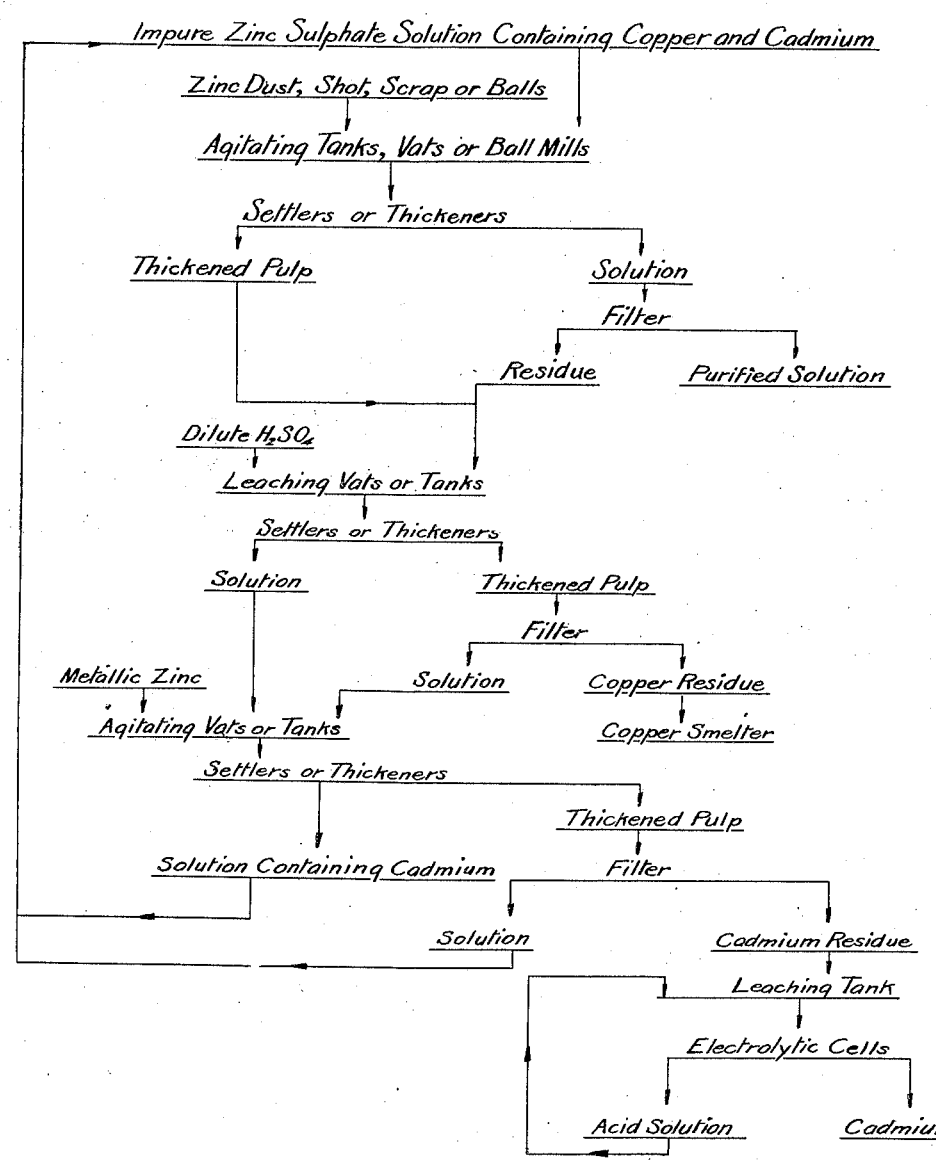

UNITED STATES PATENT OFFICE.

JAMES ORR ELTON, OF GREAT FALLS, AND RUSSEL B. CAPLES, OF CASCADE, MONTANA, ASSIGNORS TO ANACONDA COPPER MINING COMPANY, OF ANACONDA, MONTANA, A CORPORATION OF MONTANA.

PROCESS OF TREATING RESIDUES CONTAINING ZINC, COPPER, AND CADMIUM.

1,343,619.      Specification of Letters Patent.    Patented June 15, 1920.

Application filed January 5, 1920. Serial No. 349,368.

*To all whom it may concern:*

Be it known that we, (1) JAMES ORR ELTON, and (2) RUSSEL B. CAPLES, citizens of the United States, residing at (1) Great Falls, (2) Great Falls, in the county of (1) Cascade, (2) Cascade and State of Montana, have invented certain new and useful Improvements in Processes of Treating Residues Containing Zinc, Copper, and Cadmium, of which the following is a specification.

In the purification of zinc sulfate solutions containing copper and cadmium, prior to the electrolysis of these solutions for the recovery of zinc or for the preparation of pure zinc salts, it is customary to add zinc dust, blue powder, zinc shot, zinc balls, or zinc scrap to precipitate the copper and cadmium and other elements which are electro-negative to zinc, giving a residue or sludge containing zinc, copper, and cadmium, with smaller amounts of other elements.

According to the present invention, in its preferred embodiment, we treat this residue or sludge with dilute sulfuric acid of any desired strength in suitable tanks or vats, equipped with means for keeping the contents in agitation, until no further solution of zinc and cadmium takes place. The quantity of residue and acid should be so proportioned that at the end of a reasonable time, say from one to two hours, a small amount of free sulfuric acid, say ten grams sulfuric acid per liter of solution, remains. At this point most of the zinc and cadmium, and some of the copper will be in solution. Additional small quantities of the residue or sludge are added at suitable intervals with continued agitation until the remaining acid is just neutralized and practically all of the copper precipitated by the metallic zinc and cadmium. After the final addition of residue or sludge a small amount of finely ground limestone, ($CaCO_3$), or other suitable neutralizing agent is added to insure the neutralizing of all acid.

The tank or vat in which the agitation has taken place is discharged to suitable apparatus such as a settling tank and filter, for separating the solution from the residue that remains undissolved in the above leach. The residue will contain practically all of the copper in the original residue or sludge, together with any other material insoluble in dilute sulfuric acid, but only comparatively small amounts of undissolved zinc and cadmium. If so desired the residue or sludge may be roasted before the leaching operation. The residue obtained from this leach is a desirable material for treatment in the copper smelter. The solution so obtained will contain most of the zinc and cadmium that were contained in the original residue or sludge, and is sent to a suitable tank or vat, preferably provided with some means of agitation, where very finely divided metallic zinc is slowly added in amounts not sufficient to precipitate all of the cadmium in solution, usually leaving about the same percentage in solution as is contained in the solution from which the original residue or sludge was obtained, say from one-tenth or two-tenths of one gram of cadmium per liter of solution. The size of the zinc particles used, and the rate at which it is added, will largely determine the cadmium content of the resulting precipitate or residue.

The larger the size of the zinc particles and the more rapid their addition to the solution the lower will be the cadmium content and the higher the zinc content of the resulting residue or precipitate.

The solution and residue, after the precipitation of the cadmium, are sent to a suitable apparatus for their separation. The solution contains most of the zinc in the original residue or sludge, plus the zinc that has been consumed in the precipitation of cadmium, and is returned to the original solution from which the copper-cadmium-zinc sludge or residue was obtained, to be purified from the remaining cadmium. The residue containing most of the cadmium may best be treated by dissolving in sulfuric acid of suitable strength, either with or without preliminary roasting, as desired, and the resulting solution electrolyzed under suitable conditions for the recovery of cadmium. If preferred the cadmium residue or precipitate may be treated in a retort, separating the cadmium from any remaining zinc by fractional distillation.

The effect of these operations is to reduce the ultimate cost of production of pure zinc sulfate by converting the impurities present in the original solution into easily marketable products, while at the same time reducing the quantity of zinc discarded in the purification residue or sludge.

The accompanying drawing is a diagrammatic flow sheet of the process in a preferred embodiment.

We claim:—

1. Process of treating impure zinc sulfate solutions containing copper and cadmium, comprising precipitating copper and cadmium therefrom by zinc in excess and separating the residue from the purified solution; treating said residue with sulfuric acid proportioned to dissolve substantially all of the zinc and cadmium while leaving the copper substantially undissolved; and precipitating cadmium from the solution by means of zinc.

2. Process of treating impure zinc sulfate solutions containing copper and cadmium, comprising precipitating copper and cadmium therefrom by zinc in excess and separating the residue from the purified solution; treating said residue with sulfuric acid proportioned to dissolve substantially all of the zinc and cadmium while leaving the copper substantially undissolved; precipitating cadmium from the solution by means of zinc, and adding the resulting solution to the original impure solution.

3. Process of recovering values from residues containing zinc, copper and cadmium, comprising treating the same with sulfuric acid proportioned to dissolve substantially all of the zinc and cadmium while leaving the copper substantially undissolved; and precipitating cadmium from the resulting solution by means of zinc.

In testimony whereof, we affix our signatures.

JAMES ORR ELTON.
RUSSEL B. CAPLES.